United States Patent [19]

Clapp, Jr.

[11] Patent Number: 4,591,309

[45] Date of Patent: May 27, 1986

[54] DUAL-REEL LOADER CONSTRUCTION

[75] Inventor: James A. Clapp, Jr., Hammond, Ind.

[73] Assignee: Champion Corporation, Hammond, Ind.

[21] Appl. No.: 575,175

[22] Filed: Jan. 30, 1984

[51] Int. Cl.⁴ .......................... B60P 1/48; B65H 19/20
[52] U.S. Cl. ................................. 414/546; 242/86.7; 414/911
[58] Field of Search ............... 414/546, 555, 911, 608, 414/745, 24.6, 607, 623, 684, 426–430; 242/86.5 R, 86.7; 212/255, 259

[56] References Cited

U.S. PATENT DOCUMENTS

| | | | |
|---|---|---|---|
| 809,721 | 1/1906 | Myers | 242/86.7 |
| 1,333,179 | 3/1920 | Lewis | 414/745 |
| 2,335,516 | 11/1943 | Koonce | 414/911 X |
| 2,789,778 | 4/1957 | Zogg et al. | 242/86.7 |
| 3,063,584 | 11/1962 | Fleischer et al. | 414/546 X |
| 3,165,214 | 1/1965 | Young | 414/546 |
| 3,184,082 | 5/1965 | Hall | 414/546 |
| 3,334,762 | 8/1967 | Davis | 414/623 X |
| 3,820,673 | 6/1974 | McVaugh | 414/546 |
| 4,228,967 | 10/1980 | Woodruff | 414/546 X |

Primary Examiner—Robert J. Spar
Assistant Examiner—David A. Bucci
Attorney, Agent, or Firm—McDougall, Hersh & Scott

[57] ABSTRACT

A reel loader apparatus comprising a mechanism for loading reels onto a supporting bed and for unloading the reels, the mechanism including pivotally mounted arms having engaging openings at their outer ends for receiving reels to thereby achieve lifting of the reels during loading and unloading operations. The reels carry laterally extending spindles for use in lifting the reels, and a loading and unloading structure includes bars extending between the spindles of the pair of reels. One bar is located on each side of the pair of reels, and the bars are connected to the respective spindles so that the bars hold the reels in assembly. A rod or the like is carried by each bar so that the arms are adapted to lift the assembly for loading and unloading of the reels.

4 Claims, 3 Drawing Figures

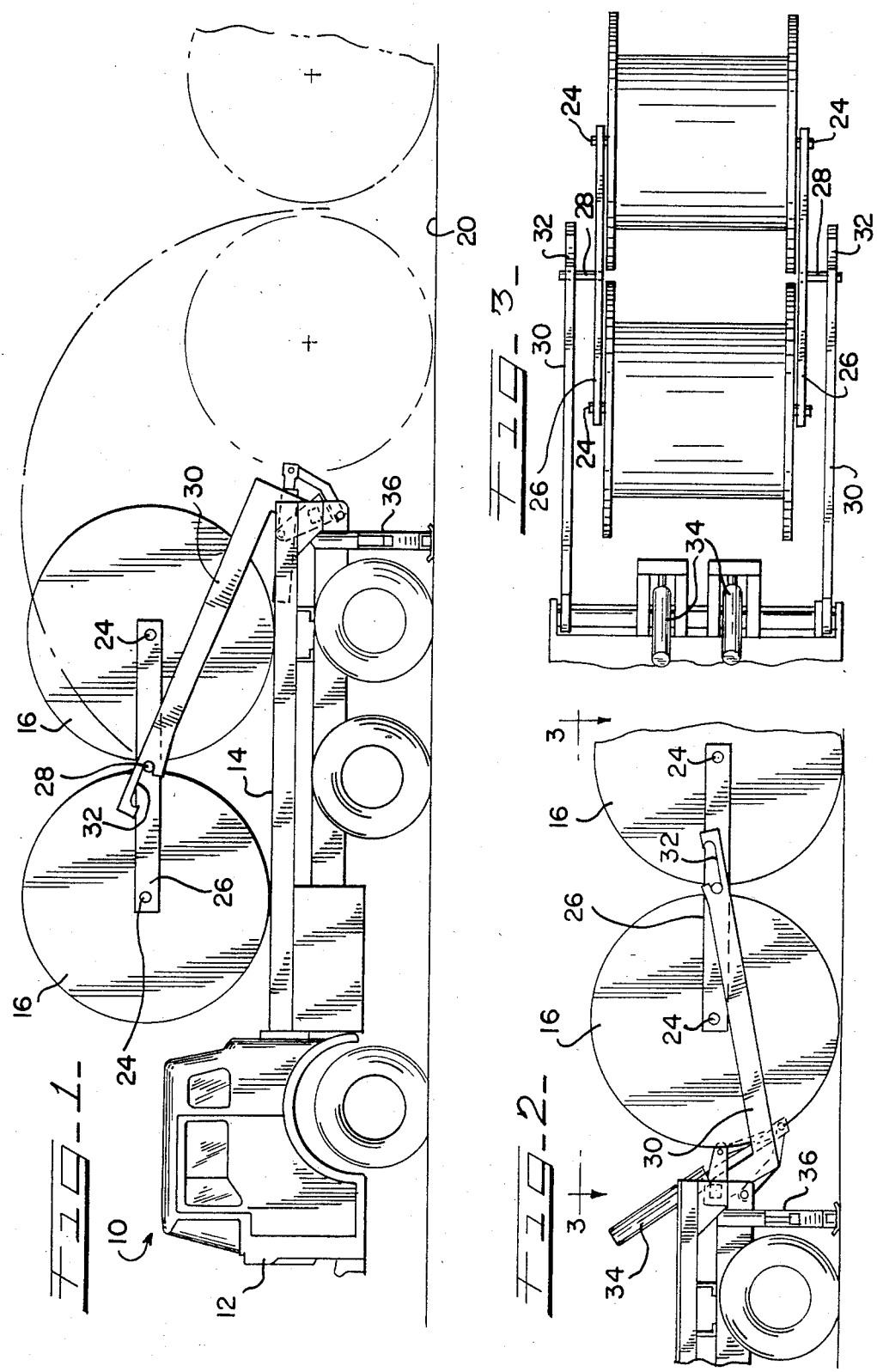

DUAL-REEL LOADER CONSTRUCTION

BACKGROUND OF THE INVENTION

This invention relates to a reel loader of the type including a mechanism employed for loading and unloading reels with respect to a supporting bed. The mechanisms are particularly designed for handling relatively large reels which cannot be efficiently handled by individuals, and the mechanisms are preferably of the type carried on the supporting bed. Since the bed may comprise a truck bed, the mechanisms are then available for loading and unloading operations irrespective of the location of the bed.

Mechanisms of the type involved are generally of the type employing lift arms pivotally mounted on a supporting bed. Examples of structures of this type are found in U.S. Pat. Nos. 3,184,082; 3,325,118; 3,063,584; 3,036,790, 3,820,673 and 4,228,967. These patents describe lift arms which are associated with truck beds whereby reels employed for telephone cable and the like can be loaded and unloaded.

U.S. Pat. No. 3,820,673 in particular discloses an apparatus for handling cable reels and the like which is especially suited for the handling of structures of various sizes. The apparatus includes mechanisms particularly adapted for adjustability whereby cable reels and other structures can be most efficiently loaded on truck beds and the like with maximum efficiency.

U.S. Pat. No. 4,228,967 is directed to improvements in loading and unloading mechanisms as described in the '673 patent. Such loaders operate to handle reels of a standard type including a center section for holding cable and a flange at either end of the center section. Each flange defines a rim which will rest on the bed when a reel has been positioned on the bed.

That invention was more particularly directed to reel drive means suitable for rotating a reel located on a bed. The reel could then be utilized for feeding cable or for retracting cable and winding the cable back onto a reel.

SUMMARY OF THE INVENTION

This invention involves a reel loader which may be used, in a general sense, in conjunction with structural and operational features as described in the aforementioned prior art patents. The invention adds the features of dual capability, that is, the ability to simultaneously handle a pair of reels.

More specifically, the invention comprises a mechanism for loading reels onto a supporting bed and for unloading the reels. The mechanism includes pivotally mounted arms having engaging means at their outer ends for engagement with the reels to achieve lifting of the reels during loading and unloading operations.

The improvement of the invention includes means for simultaneously loading and unloading a pair of wheels. These means include bar means extending between the pair of wheels with one bar means being located on each side of the pair. The bar means are respectively connected to spindles which are typically associated with each of the reels. This arrangement results in holding of the reels in assembly by the bar means.

The bar means carry engaging means for engagement with engaging means of the pivotally mounted arms. When such engagement of the bar means on opposite sides of the pair of reels is accomplished, the lifting arms are adapted to simultaneously lift the reels to achieve loading and unloading operations.

BRIEF DESCRIPTION OF THE DRAWINGS

FIG. 1 is a side elevation of a truck including reel loading and unloading means of the type contemplated by the invention;

FIG. 2 is a fragmentary side elevation illustrating the reels after movement from the truck bed to the ground;

FIG. 3 is a plan view of the reels as shown in FIG. 2 taken about the line 3—3 of FIG. 2.

DESCRIPTION OF PREFERRED EMBODIMENTS

FIG. 1 of the accompanying drawings illustrates a truck 10 including a cab section 12 and a truck bed section 14. The invention will be described with reference to such trucks; however, it will be appreciated that the invention may be used for other applications involving reels of the type being discussed.

In FIG. 1, the structures identified by the numeral 16 represent cable reels. The truck 10 includes mechanisms suitable for loading and unloading structures of these types from the ground level 20 to the truck bed 14.

The reels 16 include laterally extending spindles 24 which may comprise elongated bars or rods extending through openings defined along the axis of the reels. As explained in the aforementioned patents, such spindles typically provide a means for engagement by transfer arms whereby the transfer arms are adapted to lift a reel from the ground onto a truck bed and to also transfer a reel from the truck bed to the ground.

In accordance with the present invention, an elongated bar 26 extends between spindles 24 of a pair of reels, a bar 26 being provided on each side of this pair. The bars define openings at their ends for receiving the spindles 24 whereby the bars hold the pair of reels in an assembly.

Each of the bars 26 carries a rod 28 at approximately the center of the bar. A transfer means consisting of transfer arms 30 is provided for engaging the respective rods 28. The transfer means include sockets 32 defined at their outer ends for receiving a rod 28 and for holding a transfer arm in engagement with a rod.

In a typical embodiment, the transfer arms may be actuated by means of pistons and cylinders 34 associated with the truck bed. As explained in the cited prior art patents, these piston and cylinder means operate to pivot the transfer arms between a first position engaging a reel on a truck bed and a second position with the reel on the ground.

In accordance with this invention, the transfer arms 30 engage the pair of reels as shown in FIG. 1. The arms are then adapted to move to a second position engaging a pair of reels on the ground as shown in FIG. 2. The operation of the reel loader construction shown in the drawing is initiated with the transfer arms 30 in a certain position depending on the location of the reels to be handled. In the position shown in FIG. 1, a pair of reels 16 is already in place on the truck bed. If preferred, the transfer arms 30 may be held in this position during movement of the truck from one point to another so that the transfer arms provide an additional means for maintaining the reels on the bed. This arrangement avoids the necessity for unduly complicated and expensive mechanisms which would serve to hold the reels in place on the truck bed independently of the position of the arms 30.

FIG. 2 illustrates the reel 16 after movement by the arms for lifting the reels off the truck bed. The piston and cylinder arrangement 34 is employed for achieving this lifting action; however, other means may also be utilized for this purpose. Reference is made to McVaugh U.S. Pat. No. 3,820,673 for a more specific description of the piston and cylinder arrangement 34 which serves as an example of a suitable means for performing the lifting operation. Woodruff U.S. Pat. No 4,228,967 provides a suitable reference with respect to jacks 36 utilized for stabilizing the truck during such lifting operations.

When the truck 10 carrying the pair of reels has been driven to a desired location, the jack 36 may be operated to stabilize the truck and the cable unwound while in place on the truck. Provision may be made for driving the reels as described in the '967 patent or the unwinding may take place utilizing any other conventional technique. In some instances, it may also be desirable to utilize the transfer arms 30 for lifting the reels for movement onto the ground or into association with some independent unwinding mechanism.

With the arrangement of this invention, the transfer arms 30 can be employed for lifting the two reels upwardly relative to the truck bed and for then rotating the bars 26 through 180° to thereby invert the positions of the reels. The transfer arms can then be operated to lower the reels back onto the bed whereby the cable on the other reel can be unwound.

The apparatus of the invention also has the advantage of providing a means for simultaneously lifting a pair of reels onto and off of a truck bed or the like. Accordingly, it is not necessary to provide any means for shifting reels from a forward to a rearward position on a truck bed, as shown for example, in the aforementioned Woodruff '967 patent. This provides time and labor savings.

It will be understood that various changes and modifications in the above-described structure may be made without departing from the spirit of the invention particularly as defined in the following claims.

I claim:

1. In a reel loader apparatus comprising a truck defining a supporting bed and a rear end portion and having a mechanism for loading cable reels onto said supporting bed and for unloading the reels, the mechanism including a pair of spaced-apart pivotally mounted arms attached at the rear end portion of the truck and having engaging means at their outer ends for engagement with said reels to thereby achieve lifting of the reels during loading and unloading operations, the reels carrying laterally extending spindles for use in lifting the reels, the improvement comprising means for simultaneously loading a pair of reels onto said bed whereby the reels are positioned one in front of the other, and for unloading the pair of reels from the bed, said loading means including two bar means extending between said pair of reels, one bar means being located on each side of said pair, means connecting said bar means to the respective spindles whereby the bar means hold the reels in a predetermined spaced-apart relationship, and engaging means carried by each of the bar means for engagement with said engaging means on respective ones of said arms whereby said arms are adapted to lift the two bar means for loading and unloading reels, said means connecting the bar means to the spindles permitting unwinding of the cable from a reel supported on the bed, and said pair of spaced-apart arms and their respective bar means holding said reels in said predetermined spaced-apart relationship on said bed during travelling of the truck or unwinding.

2. An apparatus in accordance with claim 1 wherein said bar means each include a rod extending outwardly for engagement by the engaging means of said arms.

3. An apparatus according to claim 2 wherein said rods are located centrally of the respective bar means, and wherein the means connecting the bar means to the spindles of said reels are located on opposite sides of the rods at points substantially equidistant from the rods.

4. An apparatus according to claim 3 wherein said bar means defines openings for receiving the ends of said spindles for thereby connecting the bar means to the spindles.

* * * * *